(12) United States Patent
Sakata et al.

(10) Patent No.: US 11,177,046 B2
(45) Date of Patent: Nov. 16, 2021

(54) PRESSURE VESSEL

(71) Applicant: IHI CORPORATION, Tokyo (JP)

(72) Inventors: Toshiyuki Sakata, Tokyo (JP);
Nobuyuki Honma, Tokyo (JP); Shigeki Sakakura, Tokyo (JP); Kohei Tsurugaya, Tokyo (JP); Daisuke Tsunoda, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/405,474

(22) Filed: May 7, 2019

(65) Prior Publication Data

US 2019/0267144 A1 Aug. 29, 2019

Related U.S. Application Data

(63) Continuation of application No. PCT/JP2017/041813, filed on Nov. 21, 2017.

(30) Foreign Application Priority Data

Nov. 25, 2016 (JP) .............................. JP2016-228851

(51) Int. Cl.
F28D 7/16 (2006.01)
G21C 13/028 (2006.01)
(Continued)

(52) U.S. Cl.
CPC .......... G21C 13/0285 (2013.01); F16J 12/00 (2013.01); F28D 7/16 (2013.01); F28F 9/12 (2013.01)

(58) Field of Classification Search
CPC .... F16L 23/024; F16L 25/14; G21C 13/0285; F16J 12/00; F28D 7/16; F28D 7/1653
See application file for complete search history.

(56) References Cited

U.S. PATENT DOCUMENTS 5,881,553 A 3/1999 Steenackers et al.
2001/0018962 A1 9/2001 Joshi et al.
(Continued)

FOREIGN PATENT DOCUMENTS

CN 102721304 A 10/2012
CN 103267434 A 8/2013
(Continued)

OTHER PUBLICATIONS

European Patent Office, "Extended European Search Report", issued in European Patent Application No. 17 873 055.2, which is a counterpart to U.S. Appl. No. 16/405,474, dated May 19, 2020, 7 pages.
(Continued)

Primary Examiner — Lily C Garner

(57) ABSTRACT

A pressure vessel includes a pressure vessel body provided with a flow channel through which a fluid is caused to flow, having a rectangular cross-sectional shape, and formed to extend in a direction of flow of the fluid, a body flange provided at at least one end side of the pressure vessel body in a longitudinal direction and having a circular cross-sectional shape, and a connecting member connecting the pressure vessel body and the body flange to each other, and the connecting member has a body-flange connected portion connected to the body flange, having a circular cross-sectional shape, and formed in a cylindrical shape, a pressure-vessel-body connected portion connected to the pressure vessel body, being larger in outer shape than the body-flange connected portion, and formed in a cylindrical shape, and a connecting portion connecting the body-flange connected portion and the pressure-vessel-body connected portion to each other and formed in a cylindrical shape with a shape changing to be gradually smaller from the pressure-
(Continued)

vessel-body connected portion toward the body-flange connected portion.

7 Claims, 7 Drawing Sheets

(51) Int. Cl.
  *F28F 9/12* (2006.01)
  *F16J 12/00* (2006.01)

(56) References Cited

U.S. PATENT DOCUMENTS

| | | |
|---|---|---|
| 2003/0010479 A1 | 1/2003 | Hayashi et al. |
| 2007/0295479 A1 | 12/2007 | Fulmer |
| 2011/0168370 A1 | 7/2011 | Garret et al. |
| 2011/0186278 A1 | 8/2011 | Rizzi et al. |
| 2012/0103578 A1 | 5/2012 | Taylor |
| 2012/0210995 A1 | 8/2012 | West |
| 2016/0003552 A1 | 1/2016 | Chordia et al. |
| 2017/0131042 A1 | 5/2017 | Fujita et al. |

FOREIGN PATENT DOCUMENTS

| | | |
|---|---|---|
| CN | 105582773 A | 5/2016 |
| CN | 205505804 U | 8/2016 |
| JP | H10-054229 A | 2/1998 |
| JP | H10-318050 A | 12/1998 |
| JP | 2000-193381 A | 7/2000 |
| JP | 2001-241872 A | 9/2001 |
| JP | 2002-107091 A | 4/2002 |
| JP | 2003-201923 A | 7/2003 |
| JP | 2011-525609 A | 9/2011 |
| JP | 2012-502788 A | 2/2012 |
| JP | 2012-525562 A | 10/2012 |
| JP | 2013-508150 A | 3/2013 |
| JP | 2013-096647 A | 5/2013 |
| JP | 5272642 B2 | 8/2013 |
| JP | 2014-001830 A | 1/2014 |
| JP | 2015-183905 A | 10/2015 |
| JP | 2016-109106 A | 6/2016 |
| WO | 2014/152239 A2 | 9/2014 |

OTHER PUBLICATIONS

The State Intellectual Properly Office of People's Republic of China, "First Office Action", issued in Chinese Patent Application No. 201780068207.4, which is a counterpart to U.S. Appl. No. 16/405,474, dated Mar. 30, 2020, 7 pages.

China National Intellectual Property Administration, "Second Office Action", issued in Chinese Patent Application No. 201780068207.4, which is a counterpart to U.S. Appl. No. 16/405,474, dated Dec. 7, 2020, 7 pages.

Zhao Renda, "Long Span Railway Bridge," Dec. 31, 2002, p. 70, <online> https://www.jingjilei.cn.n/dsrqw/book/base/13112133/67da586fc09c4d40bc09b8ab18d5a485/123ca0a8a25c115c2b910af2875a9ef6.shtml?dm=-845579977&dxid . . . retrieved on Dec. 1, 2020.

Li Zhixiang, "Applied Building Mechanics, 2003," Dec. 31, 2003, p. 128, <online> http://www.yuyanwz.cn/n/dsrqw/book/base/11245656/1a0bee8272824292a6bcf5413dc92ea5/e69cd002000d5aa56a1de36eb3a9acd9.shtml?dm=1389283459&d . . . retrieved on Dec. 1, 2020.

Japan Patent Office, "Notice of Reasons for Refusal", issued in Japanese Patent Application No. 2016-228851, which is a Japanese counterpart to U.S. Appl. No. 16/405,474, dated Aug. 3, 2021, 2 pages.

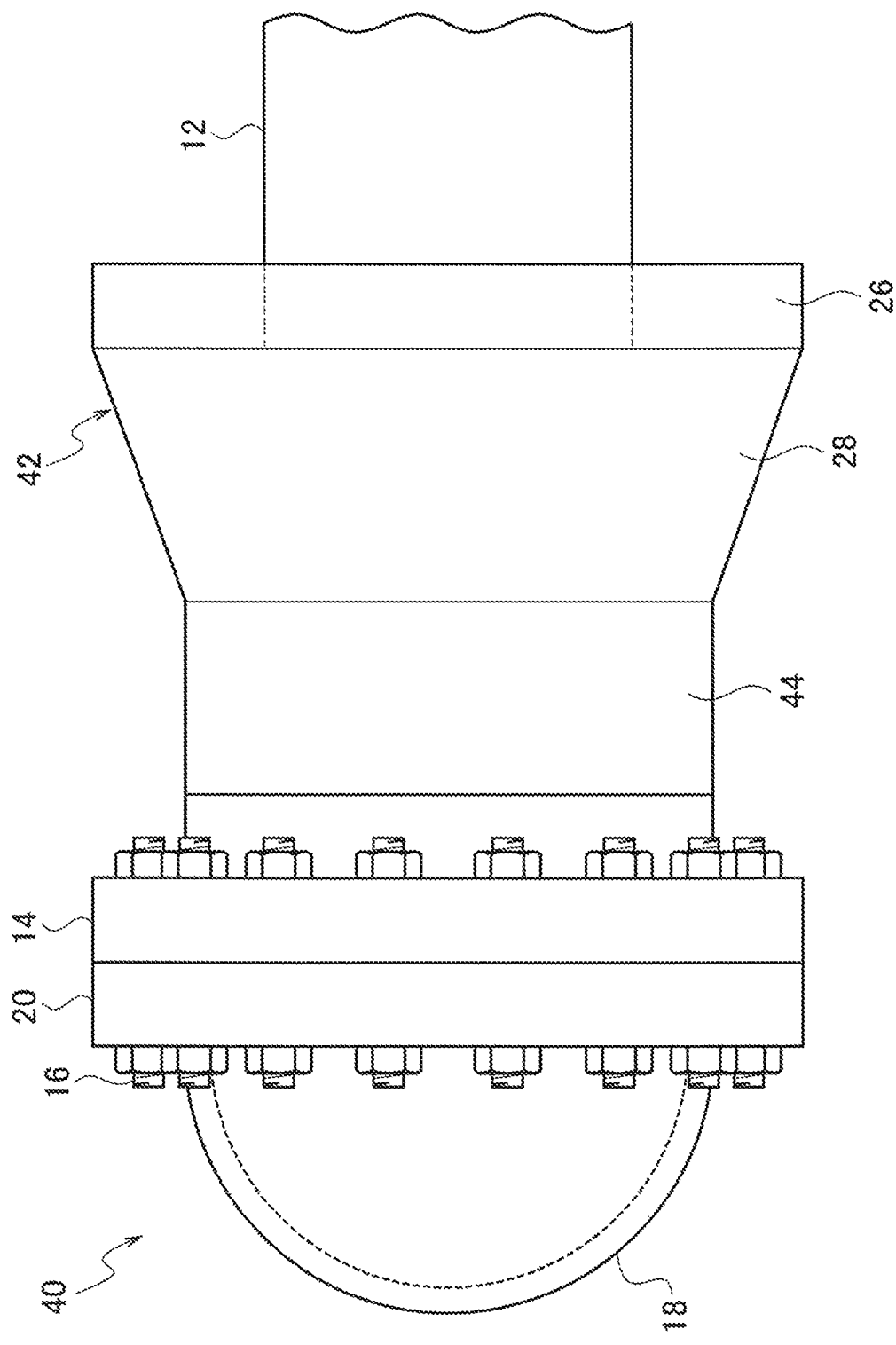

PRESSURE VESSEL

CROSS REFERENCE TO RELATED APPLICATIONS

This application is a continuation application of International Application No. PCT/JP2017/041813, filed on Nov. 21, 2017, which claims priority to Japanese Patent Application No. 2016-228851, filed on Nov. 25, 2016, the entire contents of which are incorporated by references herein.

BACKGROUND

1. Field

The present disclosure relates to a pressure vessel.

2. Description of the Related Art

In pressure vessels such as reactors and heat exchangers, heat exchange is performed between a primary fluid and a secondary fluid for production of a reacted product, heating, cooling, and so on. A pressure vessel configured as a heat exchanger is described in Published Japanese Translation of PCT International Application No. 2012-525562 (Patent Literature 1).

SUMMARY

Meanwhile, FIG. 1 is a schematic view illustrating the configuration of a conventional pressure vessel 100. The conventional pressure vessel 100, which is a reactor, a heat exchanger, or the like, includes a shell part 102 provided with flow channels through which fluids are caused to flow, and a shell flange 104 provided on at least one end side of the shell part 102 in the longitudinal direction. The shell part 102 has a rectangular cross-sectional shape. The shell flange 104 has a circular cross-sectional shape. For example, the shell flange 104 is fastened to a lid flange 108 of a lid member 106 with fastening members such as bolts 110 so as to be openable and closable. The one end side of the shell part 102 is inserted and fitted in the shell flange 104 and joined to the shell flange 104 by welding or the like.

A fastening load caused when the shell flange 104 and the lid flange 108 are fastened with fastening members such as the bolts 110 is applied to the portion of the shell part 102 fitted in the shell flange 104. Since the shell part 102 and the shell flange 104 have different cross-sectional shapes, the cross-sectional shape is discontinuous between them. Thus, edges and the like of the shell part 102 may possibly receive an excessive load resulting from the fastening load. More specifically, corners and the like of the fitted portion of the shell part 102 on the one end side inserted and fitted in the shell flange 104 may possibly receive an excessive load. Then, to reduce the application of the fastening load to the shell part 102, the thickness of the shell flange 104 needs to be large, which may increase the manufacturing cost of the pressure vessel 100.

In view of this, an object of the present disclosure is to provide a pressure vessel whose manufacturing cost can be made lower.

A pressure vessel according to the present disclosure includes a pressure vessel body provided with a flow channel through which a fluid is caused to flow, having a rectangular cross-sectional shape, and formed to extend in a direction of flow of the fluid, a body flange provided at at least one end side of the pressure vessel body in a longitudinal direction and having a circular cross-sectional shape, and a connecting member connecting the pressure vessel body and the body flange to each other, and the connecting member has a body-flange connected portion connected to the body flange, having a circular cross-sectional shape, and formed in a cylindrical shape, a pressure-vessel-body connected portion connected to the pressure vessel body, being larger in outer shape than the body-flange connected portion, and formed in a cylindrical shape, and a connecting portion connecting the body-flange connected portion and the pressure-vessel-body connected portion to each other and formed in a cylindrical shape with a shape changing to be gradually smaller from the pressure-vessel-body connected portion toward the body-flange connected portion.

The pressure vessel according to the present disclosure may be such that the pressure-vessel-body connected portion has a rectangular cress-sectional shape, and the connecting portion is formed such that one end thereof connected to the pressure-vessel-body connected portion is formed in a rectangular shape while another end thereof connected to the body-flange connected portion is formed in a circular shape and a cross-sectional shape of the connecting portion gradually changes from the rectangular shape into the circular shape from the one end, connected to the pressure-vessel-body connected portion, toward the other end, connected to the body-flange connected portion.

The pressure vessel according to the present disclosure may be such that the pressure-vessel-body connected portion has a circular cross-sectional shape, and the connecting portion is formed in a conical, semi-spherical, or semi-ellipsoidal shape.

The pressure vessel according to the present disclosure may be such that the body-flange connected portion is formed to extend in the longitudinal direction of the pressure vessel body.

In the pressure vessel with the above configuration, the pressure vessel body does not need to be directly mounted to the body flange. Hence, when the body flange is fastened with fastening members such as bolts, it is possible to reduce the application of the fastening load to the pressure vessel. Accordingly, the thickness of the body flange can be smaller and therefore the manufacturing cost of the pressure vessel can be lower.

BRIEF DESCRIPTION OF DRAWINGS

FIG. 7 is a schematic side view illustrating the configuration of the pressure vessel in the third embodiment of the present disclosure.

DESCRIPTION OF EMBODIMENTS

Embodiments of the present disclosure will be described below in detail by using drawings.

First Embodiment

Figure 1:
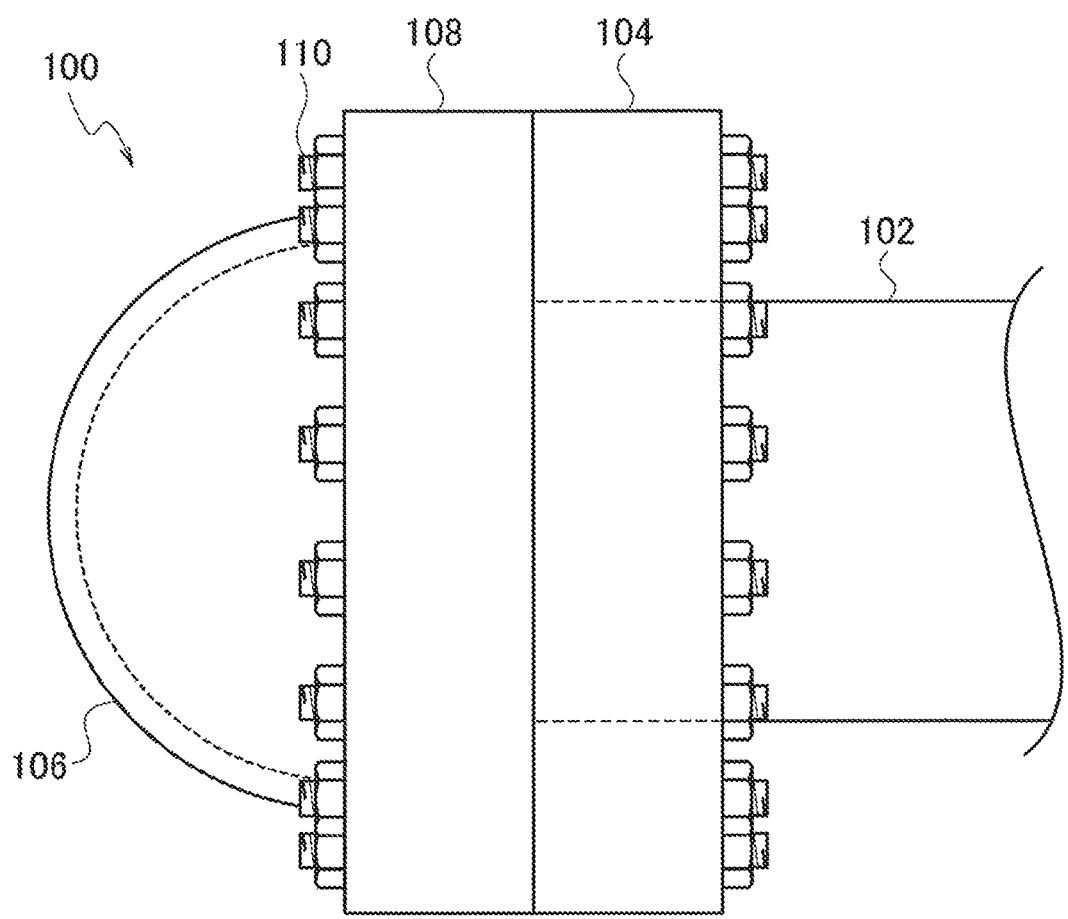
FIG. 1 is a schematic view illustrating the configuration of a conventional pressure vessel.
Figure 2:
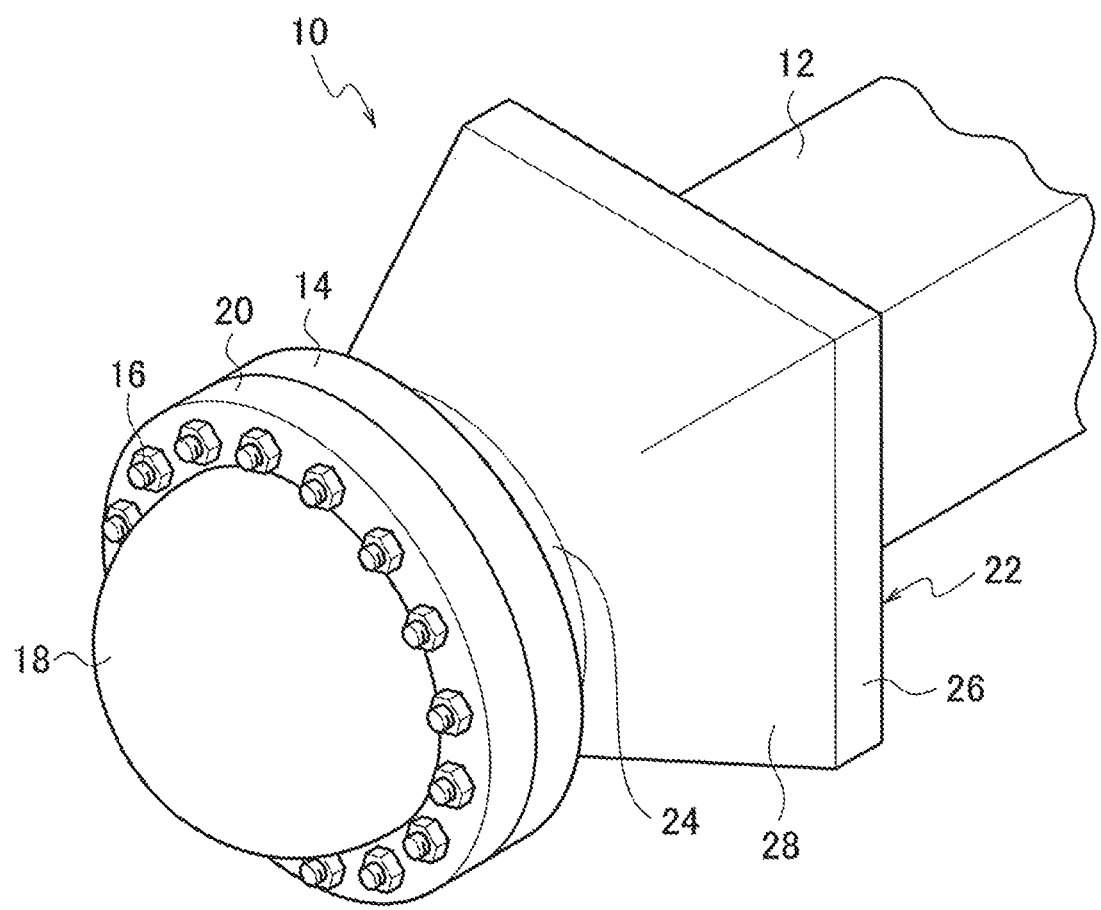
FIG. 2 is a schematic perspective view illustrating the configuration of a pressure vessel in a first embodiment of the present disclosure.
Figure 3:
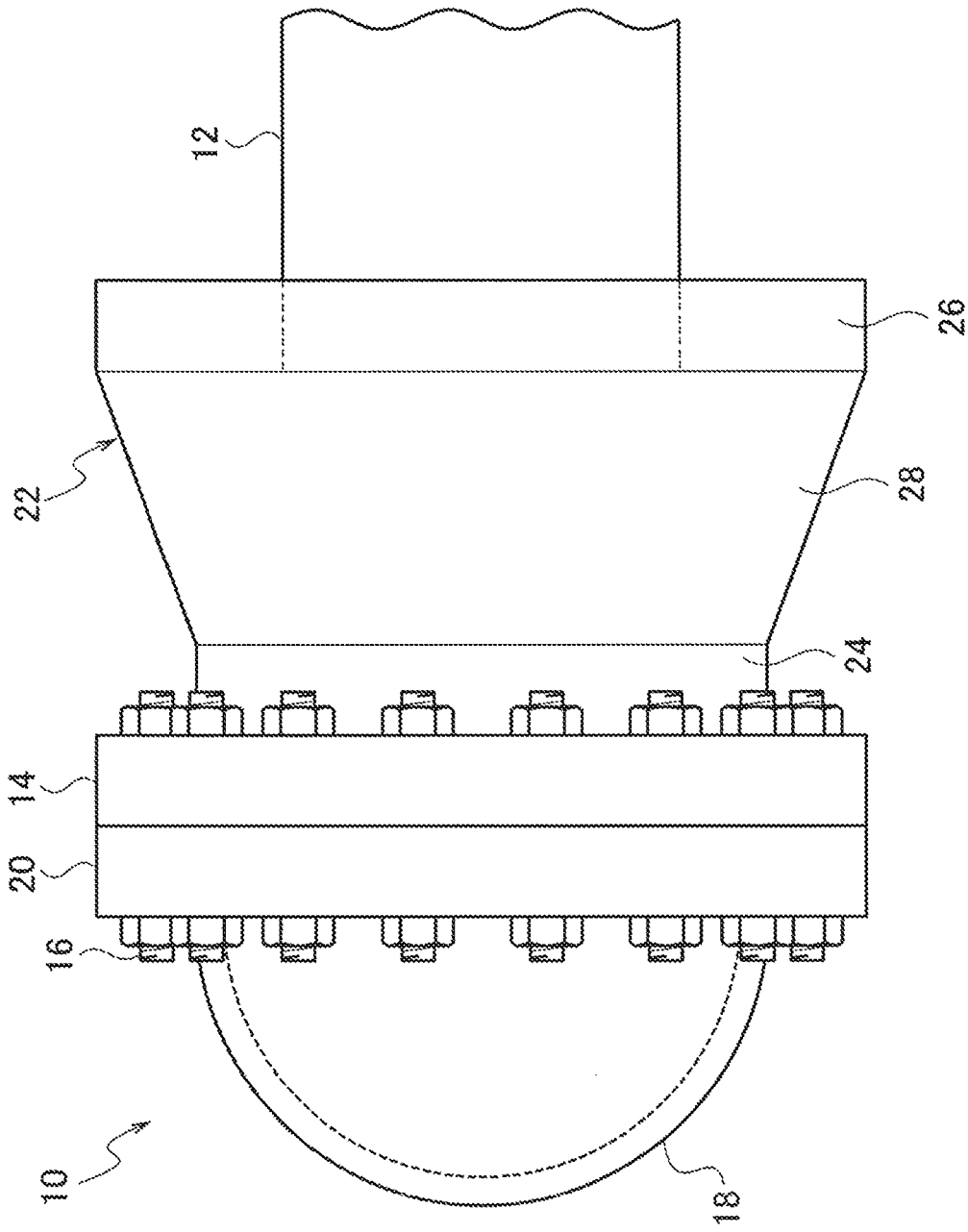
FIG. 3 is a schematic side view illustrating the configuration of the pressure vessel in the first embodiment of the present disclosure.

A first embodiment of the present disclosure will be described in detail by using drawings. FIG. 2 is a schematic perspective view illustrating the configuration of a pressure vessel 10. FIG. 3 is a schematic side view illustrating the configuration of the pressure vessel 10. The pressure vessel 10 is configured as a reactor, a heat exchanger, or the like, for example. The pressure vessel 10 includes a pressure vessel body 12 and a body flange 14 provided at at least one end side of the pressure vessel body 12 in the longitudinal direction.

The pressure vessel body 12 is provided with a flow channel through which a fluid is caused to flow, has a rectangular cross-sectional shape, and is formed to extend in the direction of flow of the fluid. The pressure vessel body 12 is formed in a cuboidal shape or the like, for example. The pressure vessel body 12 is made of stainless steel, a Ni (nickel) alloy, low-alloy steel, carbon steel, or the like. The pressure vessel body 12 has a flow channel (not illustrated) through which a fluid is caused to flow. The flow channel may be provided as a single flow channel or provided as a plurality of flow channels. The flow channel may be formed along the longitudinal direction of the pressure vessel body 12. The flow channel may be formed in a straight shape or formed in a meandering shape. In-channel components such as catalyst members and fins may be disposed in the flow channel. A fluid inlet-outlet port (not illustrated) may be provided in one end surface of the pressure vessel body 12 in the longitudinal direction, the fluid inlet-outlet port being a port which connects with the flow channel and through which the fluid is caused to flow in or out.

The body flange 14 is provided at at least one end side of the pressure vessel body 12 in the longitudinal direction. The body flange 14 is provided separated from the one end side of the pressure vessel body 12. The body flange 14 has a circular cross-sectional shape. The body flange 14 can be formed by using a weld neck flange (butt-welded flange). The opening portion of the body flange 14 may be formed in a circular shape or the like. In the periphery of the body flange 14, the body flange 14 has fastening holes for fastening it with fastening members such as bolts 16. The body flange 14 is made of stainless steel, a Ni alloy, low-alloy steel, carbon steel, or the like.

The pressure vessel 10 may include a lid member 18. The lid member 18 is formed in a dome shape or the like. The lid member 18 is provided with a lid flange 20. The lid flange 20 has a circular cross-sectional shape. The lid flange 20 is joined to the lid member 18 by welding or the like. In the periphery of the lid flange 20, the lid flange 20 has fastening holes for fastening it to the body flange 14 with fastening members such as the bolts 16. The lid member 18 and the lid flange 20 are made of stainless steel, a Ni alloy, low-alloy steel, carbon steel, or the like.

The pressure vessel 10 may include an opening and closing structure having the above-described body flange 14 and lid flange 20. With this opening and closing structure, inspection, maintenance, and so on of the pressure vessel 10 can be performed in an opened state. Note that the pressure vessel 10 may alternatively include an opening and closing structure formed of a combination of the body flange 14 and a flange obtained by mounting a different structure in place of the lid flange 20.

The pressure vessel 10 includes a connecting member 22 that connects the pressure vessel body 12 and the body flange 14 to each other. The connecting member 22 is provided between the pressure vessel body 12 and the body flange 14. The connecting member 22 has the function of connecting the pressure vessel body 12 and the body flange 14 to each other. The connecting member 22 has a body-flange connected portion 24 connected to the body flange 14, a pressure-vessel-body connected portion 26 connected to the pressure vessel body 12, and a connecting portion 28 connecting the body-flange connected portion 24 and the pressure-vessel-body connected portion 26 to each other. The length of the connecting member 22 may be approximately 160 mm, for example.

Since the connecting member 22 is mounted between the pressure vessel body 12 and the body flange 14, the pressure vessel body 12 can avoid being directly mounted to the body flange 14. Hence, when the body flange 14 is fastened with fastening members such as the bolts 16, it is possible to reduce the application of the fastening load to the pressure vessel body 12.

Moreover, since the pressure vessel body 12 is not directly mounted to the body flange 14, the thickness of the body flange 14 can be smaller. For example, in the case where the pressure vessel 10 is subjected to an internal pressure of 2 MPa at 400° C., the thickness of a conventional flange needs to be approximately 90 mm. However, with the connecting member 22 provided, the thickness of the body flange 14 can be approximately 60 mm. Since the thickness of the body flange 14 can be smaller as described above, it is possible to employ a standard flange specified in, for example, JIS or the like. Also, since the thickness of the body flange 14 can be smaller, the manufacturing cost of the pressure vessel 10 can be reduced. The connecting member 22 is made of stainless steel, a Ni alloy, low-alloy steel, carbon steel, or the like. The coupling member 22 may be made of the same material as the pressure vessel body 12 and the body flange 14. The connecting member 22 can be formed by common machining processes for metallic materials such as cutting and plastic working.

The body-flange connected portion 24 is connected to the body flange 14, has a circular cross-sectional shape, and is formed in a cylindrical shape. The body-flange connected portion 24 may be partly inserted and fitted in the opening portion of the body flange 14. The body-flange connected portion 24 is joined to the body flange 14 by welding or the like. Since the body-flange connected portion 24 and the body flange 14 have circular cross-sectional shapes, the cross-sectional shape is continuous between them. This prevents excessive application of the fastening load to the body-flange connected portion 24 when the body flange 14 is fastened with fastening members such as the bolts 16.

The pressure-vessel-body connected portion 26 is connected to the pressure vessel body 12, larger in outer shape than the body-flange connected portion 24, and formed in a cylindrical shape. The pressure-vessel-body connected portion 26 is formed such that one end side of the pressure vessel body 12 can be inserted and fitted in it. The pressure-vessel-body connected portion 26 is formed to be larger in outer shape than the body-flange connected portion 24. The pressure-vessel-body connected portion 26 is joined to the pressure vessel body 12 by welding or the like.

The pressure-vessel-body connected portion 26 may be shaped into a rectangular tube. In the case where the pressure-vessel-body connected portion 26 is shaped into a rectangular tube, the pressure-vessel-body connected portion 26 and the pressure vessel body 12 have rectangular cross-sectional shapes, and the cross-sectional shape is therefore continuous between them. This alleviates the application of stress to the pressure vessel body 12 and the pressure-vessel-body connected portion 26. The pressure-vessel-body connected portion 26 may be formed as a rectangular plate provided with a rectangular hole or the like, for example.

The connecting portion 28 connects the body-flange connected portion 24 and the pressure-vessel-body connected portion 26 to each other and is formed in a cylindrical shape with a shape changing to be gradually smaller from the pressure-vessel-body connected portion 26 toward the body-flange connected portion 24. For example, in the case where the body-flange connected portion 24 is shaped into a circular tube and the pressure-vessel-body connected portion 26 is shaped into a rectangular tube, the connecting portion 28 may be formed in a cylindrical shape with a shape changing to be gradually smaller while shifting from a rectangular tubular shape into a circular tubular shape from the pressure-vessel-body connected portion 26 toward the body-flange connected portion 24. In other words, the connecting portion 28 may be formed such that one end thereof connected to the pressure-vessel-body connected portion 26 is formed in a rectangular shape while the other end thereof, connected to the body-flange connected portion 24, is formed in a circular shape, and the cross-sectional shape gradually changes from the rectangular shape into the circular shape from the one end, connected to the pressure-vessel-body connected portion 26, toward the other end, connected to the body-flange connected portion 24. The connecting portion 28 may be formed integrally with the body-flange connected portion 24 and the pressure-vessel-body connected portion 26, or formed as a separate body and then joined to the body-flange connected portion 24 and the pressure-vessel-body connected portion 26 by welding or the like.

Note that the pressure-vessel-body connected portion may be smaller in outer shape than the body-flange connected portion and formed in a cylindrical shape. In this case, the connecting portion connects the body-flange connected portion and the pressure-vessel-body connected portion to each other and is formed in a cylindrical shape with a shape changing to be gradually larger from the pressure-vessel-body connected portion toward the body-flange connected portion. For example, in the case where the body-flange connected portion is shaped into a circular tube and the pressure-vessel-body connected portion is shaped into a rectangular tube, the connecting portion may be formed in a cylindrical shape with a shape changing to be gradually larger while shifting from a rectangular tubular shape into a circular tubular shape from the pressure-vessel-body connected portion toward the body-flange connected portion.

In the pressure vessel with the above configuration, a connecting member is mounted between its pressure vessel body and body flange and therefore the pressure vessel body does not need to be directly mounted to the body flange. Hence, when the body flange is fastened with fastening members such as bolts, it is possible to reduce the application of the fastening load to the pressure vessel. Accordingly, the thickness of the body flange can be smaller and therefore the pressure vessel can be lighter and the manufacturing cost of the pressure vessel can be lower.

Second Embodiment

Figure 4:
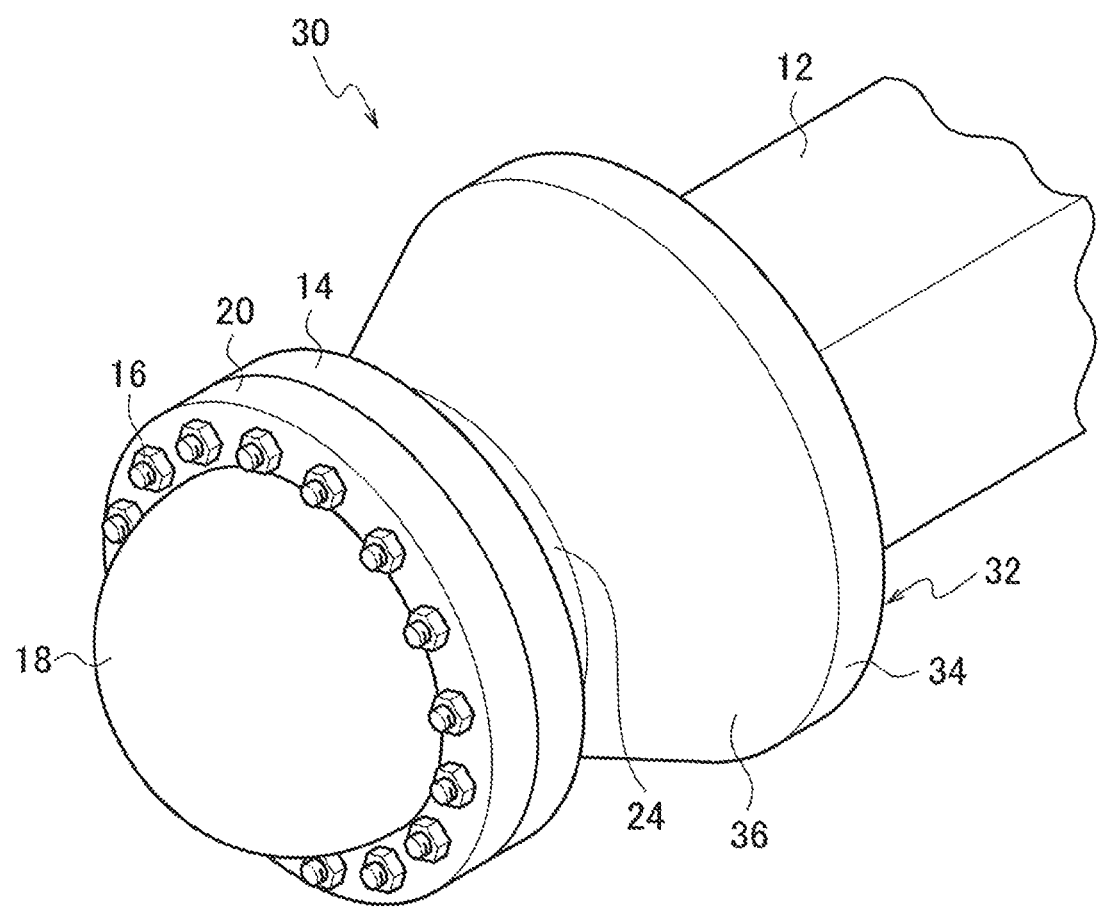
FIG. 4 is a schematic perspective view illustrating the configuration of a pressure vessel in a second embodiment of the present disclosure.
Figure 5:
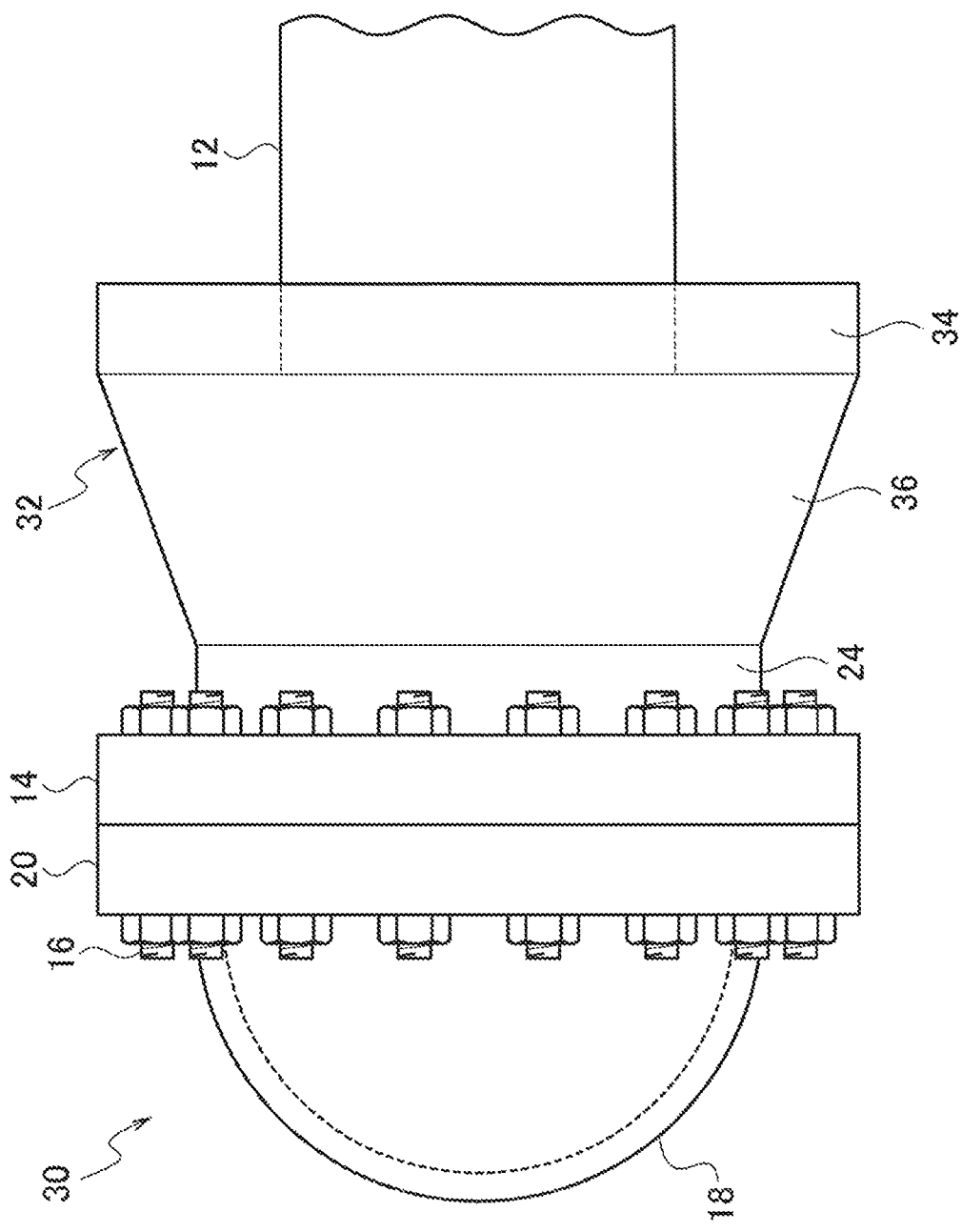
FIG. 5 is a schematic side view illustrating the configuration of the pressure vessel in the second embodiment of the present disclosure.

Next, a second embodiment of the present disclosure will be described in detail by using drawings. FIG. 4 is a schematic perspective view illustrating the configuration of a pressure vessel 30. FIG. 5 is a schematic side view illustrating the configuration of the pressure vessel 30. Note that similar components are denoted by the same reference signs, and detailed description thereof is omitted. The pressure vessel 30 in the second embodiment differs from the pressure vessel 10 in the first embodiment by the configuration of a pressure-vessel-body connected portion 34 and a connecting portion 36 in a connecting member 32.

The pressure-vessel-body connected portion 34 of the connecting member 32 is larger in outer shape than the body-flange connected portion 24, has a circular cross-sectional shape, and is formed in a cylindrical shape. The pressure-vessel-body connected portion 34 may be formed as a circular ring or the like, for example. The pressure-vessel-body connected portion 34 is formed such that one end side of the pressure vessel body can be inserted and fitted in it. The pressure-vessel-body connected portion 34 can be shaped into a ring with an outer diameter of approximately 600 mm and a thickness of approximately 90 mm, for example. The pressure-vessel-body connected portion 34 is joined to the pressure vessel body 12 by welding or the like.

The connecting portion 36 of the connecting member 32 connects the body-flange connected portion 24 and the pressure-vessel-body connected portion 34 to each other and is formed in a cylindrical shape with a shape changing to be gradually smaller from the pressure-vessel-body connected portion 34 toward the body-flange connected portion 24. Since the body-flange connected portion 24 has a circular cross-sectional shape and the pressure-vessel-body connected portion 34 has a circular cross-sectional shape, the coupling portion 36 may be formed in a conical, semi-spherical, or semi-ellipsoidal shape. The connecting portion 36 can be formed to have an inner diameter of approximately 550 mm on the pressure-vessel-body connected portion side, an inner diameter of approximately 450 mm on the body-flange connected portion side, a width of 200 mm in the longitudinal direction, and a thickness of approximately 30 mm, for example. Since the connecting portion 36 is formed in a conical, semi-spherical, or semi-ellipsoidal shape, the shape of the connecting portion 36 is simple. This makes it easy to form the connecting member 32. The connecting portion 36 may be formed integrally with the body-flange connected portion 24 and the pressure-vessel-body connected portion 34, or formed as a separate body and then joined to the body-flange connected portion 24 and the pressure-vessel-body connected portion 34 by welding or the like. Note that the material and the forming method of the connecting member 32 are similar to those of the connecting member 22 in the first embodiment, and detailed description thereof is therefore omitted.

In the above configuration, the connecting member is such that the body-flange connected portion and the pressure-vessel-body connected portion have circular cross-sectional shapes and the connecting portion is formed in a conical, semi-spherical, or semi-ellipsoidal shape. Thus, in addition to achieving the effects of the first embodiment, it is possible to form the connecting member easily.

Third Embodiment

Figure 6:
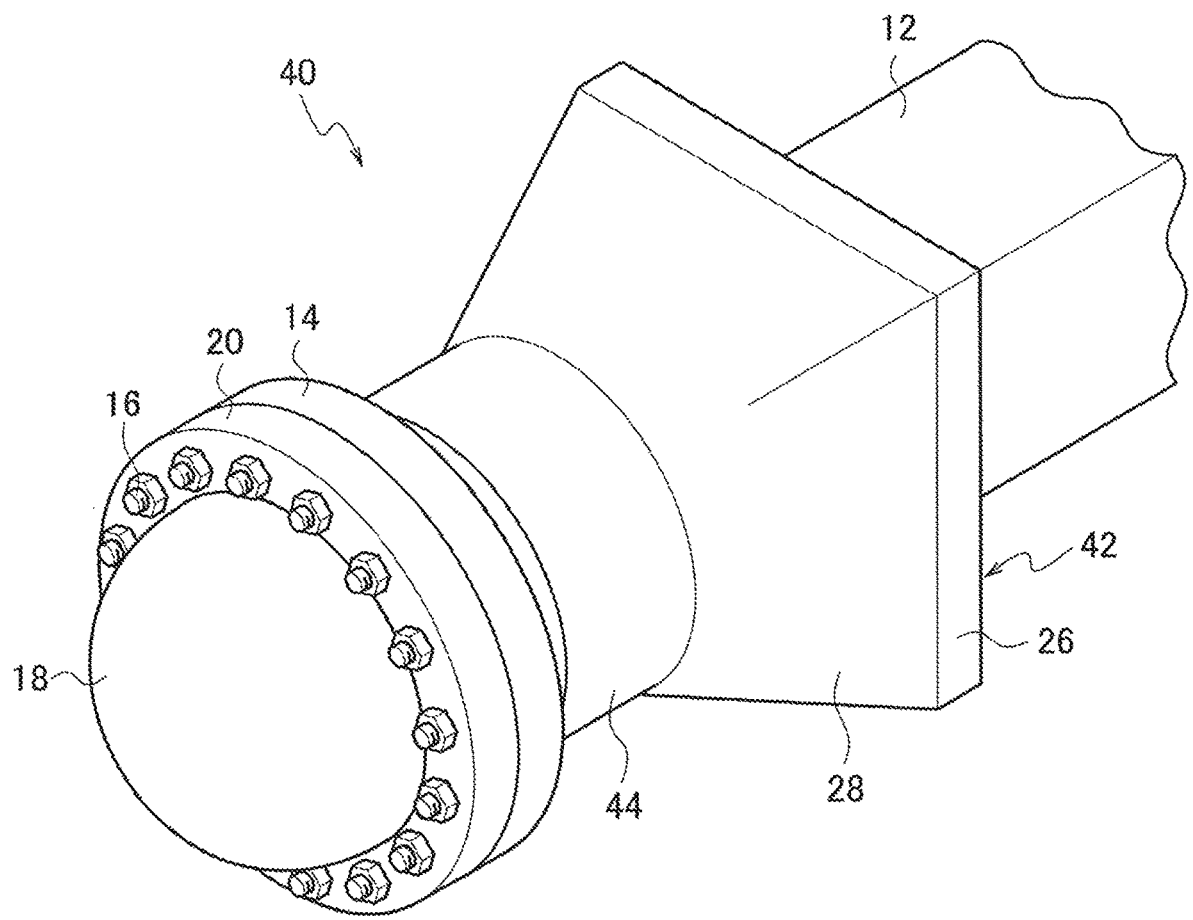
FIG. 6 is a schematic perspective view illustrating the configuration of a pressure vessel in a third embodiment of the present disclosure.

Next, a third embodiment of the present disclosure will be described in detail by using drawings. FIG. 6 is a schematic perspective view illustrating the configuration of a pressure vessel 40. FIG. 7 is a schematic side view illustrating the configuration of the pressure vessel 40. Note that similar components are denoted by the same reference signs, and detailed description thereof is omitted. The pressure vessel 40 in the third embodiment differs from the pressure vessel 10 in the first embodiment by the configuration of a body-flange connected portion 44 in a connecting member 42.

The body-flange connected portion 44 of the connecting member 42 is connected to the body flange 14, has a circular cross-sectional shape, and is formed in a cylindrical shape. The body-flange connected portion 44 is formed to extend in the longitudinal direction of the pressure vessel body 12. The body-flange connected portion 44 is shaped into, for example, a circular tube extending in the longitudinal direction of the pressure vessel body 12. In this way, a space to dispose components and so on can be provided inside the body-flange connected portion 44. Thus, the body-flange connected portion 44 can be formed to extend in the longitudinal direction of the pressure vessel body 12 to provide a space to dispose components and so on. The length of the connecting member 42 may be approximately 400 mm, for example. Note that the material and the forming method of the connecting member 42 are similar to those of the connecting member 22 in the first embodiment, and detailed description thereof is therefore omitted.

In the above configuration, the body-flange connected portion of the connecting member is formed to extend in the longitudinal direction of the pressure vessel body. Thus, in addition to achieving the effects of the first embodiment, it is possible to dispose components and so on in the body-flange connected portion.

The present disclosure can make a pressure vessel lighter and make the manufacturing cost of a pressure vessel lower and is therefore useful for reactors, heat exchangers, and the like.

What is claimed is:

1. A pressure vessel comprising:
    a pressure vessel body provided with a flow channel through which a fluid is capable of flowing, having a rectangular cross-sectional shape, and formed to extend in a longitudinal direction;
    a body flange provided at at least one end side of the pressure vessel body in the longitudinal direction and having a circular cross-sectional shape; and
    a connecting member connecting the pressure vessel body and the body flange to each other,
    wherein the connecting member has
        a body-flange connected portion connected to the body flange and having a circular cross-sectional shape,
        a pressure-vessel-body connected portion connected to the pressure vessel body, being larger in cross section than the body-flange connected portion, and having a circular cross section, and
        a connecting portion connecting the body-flange connected portion and the pressure-vessel-body connected portion to each other and formed in a conical, hemispherical, or semi-elliptical shape with a size changing to be gradually smaller from the pressure-vessel-body connected portion toward the body-flange connected portion, wherein
    the pressure-vessel-body connected portion is formed such that one end side of the pressure vessel body is insertable and fittable in the pressure-vessel-body connected portion.

2. The pressure vessel according to claim 1, wherein the body-flange connected portion is formed to extend in the longitudinal direction of the pressure vessel body.

3. The pressure vessel according to claim 1, wherein
    the body-flange connected portion is formed to extend in the longitudinal direction of the pressure vessel body, and
    the body-flange connected portion is provided with a space to dispose a component.

4. The pressure vessel according to claim 1, wherein the connecting portion is formed in a semi-spherical or semi-ellipsoidal shape.

5. The pressure vessel according to claim 1, wherein the pressure-vessel-body connected portion is larger in outer shape than the pressure vessel body.

6. The pressure vessel according to claim 1, wherein the body-flange connected portion is partly inserted and fitted in an opening portion of the body flange.

7. The pressure vessel according to claim 1, further comprising:
    a lid member provided with a lid flange, wherein the body flange and the lid flange are fastened with a fastening member.

* * * * *